United States Patent
Mauger et al.

(10) Patent No.: US 6,597,708 B1
(45) Date of Patent: Jul. 22, 2003

(54) DIGITAL COMMUNICATIONS SYSTEM

(75) Inventors: Roy Harold Mauger, Radlett (GB); Simon Daniel Brueckheimer, London (GB)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,901

(22) PCT Filed: Oct. 17, 1997

(86) PCT No.: PCT/GB97/02881

§ 371 (c)(1),
(2), (4) Date: Mar. 12, 1999

(87) PCT Pub. No.: WO98/18287

PCT Pub. Date: Apr. 30, 1998

(30) Foreign Application Priority Data

Oct. 18, 1996 (GB) ................................. 9621774

(51) Int. Cl.$^7$ ................ H04J 3/04; H04J 3/24; H04L 12/28
(52) U.S. Cl. ............... 370/535; 370/395.6; 370/474; 370/401
(58) Field of Search ............... 370/470–474, 370/469, 352, 397, 400, 401, 395.71, 395.53, 395.6, 399, 346.8, 537, 535, 394, 395.32, 395.51, 536, 476, 412, 395.54

(56) References Cited

U.S. PATENT DOCUMENTS

| | | | | | |
|---|---|---|---|---|---|
| 4,766,591 | A | * | 8/1988 | Huang | 370/445 |
| 5,420,858 | A | * | 5/1995 | Marshall et al. | 370/395.53 |
| 5,440,552 | A | * | 8/1995 | Sugita | 370/395.54 |
| 5,457,681 | A | * | 10/1995 | Gaddis et al. | 370/402 |
| 5,617,540 | A | * | 4/1997 | Civanlar et al. | 370/395.54 |
| 5,633,810 | A | * | 5/1997 | Mandal et al. | 370/431 |
| 5,732,071 | A | * | 3/1998 | Saito et al. | 370/401 |
| 5,802,051 | A | * | 9/1998 | Petersen et al. | 370/395 |
| 5,822,321 | A | * | 10/1998 | Petersen et al. | 370/474 |
| 5,878,212 | A | * | 3/1999 | Civanlar et al. | 709/203 |
| 6,125,118 | A | * | 9/2000 | Arnold | 370/397 |
| 6,173,044 | B1 | * | 1/2001 | Hortensius et al. | 379/93.09 |
| 6,226,294 | B1 | * | 5/2001 | Caves | 370/395 |
| 6,304,572 | B1 | * | 10/2001 | Christie | 370/400 |

* cited by examiner

*Primary Examiner*—Hassan Kizou
*Assistant Examiner*—Hanh Nguyen
(74) *Attorney, Agent, or Firm*—Barnes & Thornburg

(57) ABSTRACT

A network arrangement for transporting service (Servco) traffic between terminals via an asynchronous path comprises a servco access layer incorporating multimedia gateways for access by said terminals, an asynchronous network layer, a service layer incorporating adaptation layer switches each coupled to the network layer, and a transport layer providing a connection medium between the adaptation layer switches. The Servco traffic is carried in ATM minicells over the network layer. Delineation of the minicells is effected by searching the received ATM stream for a valid code word indicating the start of a minicell, and, for that minicell and subsequent minicells, determining length information so as to determine the start of each next minicell.

8 Claims, 3 Drawing Sheets

US 6,597,708 B1

DIGITAL COMMUNICATIONS SYSTEM

This invention relates to digital telecommunications systems and in particular to an arrangement and method for transmitting asynchronous transfer mode (ATM) traffic.

BACKGROUND OF THE INVENTION

A recent development in telecommunications technology has been the introduction of the asynchronous transfer mode (ATM) transmission technique. The asynchronous transfer mode (ATM) technology is a flexible form of transmission which allows various types of service traffic, e.g. voice, video or data, to be multiplexed together on to a common means of transmission, the traffic being carried in cells each having a header containing information that is employed for routing and for subsequent processing of the cell to recover the payload. The service traffic is adapted typically into 53 byte cells comprising 5 byte headers and 48 byte payloads such that the original traffic can be reconstituted at the far end of the ATM network. This form of adaptation is performed in the ATM adaptation layer (AAL). The technique allows large volumes of traffic to be handled reliably and efficiently.

A local area network (LAN) capable of supporting multimedia on demand applications over an ATM network is described by Ott et al. in NEC Research and Development, vol. 35 No. 4, Oct. 1, 1994, pages 36 to 373. An arrangement and method for communicating between devices coupled to an Ethernet network and an ATM network is described in specification No. U.S. Pat. No. 5,420,858.

A further recent development in ATM transmission has been the introduction of minicells for low bit rate users to reduce the cell assembly delays previously experienced by such users. Such minicells from a number of users can be multiplexed together and packed into a standard ATM cell for transmission over a common virtual channel. Typically, these low bit rate users are being provided with services, e.g. Internet or multimedia services from one or more service providers or Servcos. The volume of traffic of this nature is rapidly increasing as more and more customers are subscribing to the services.

A particular problem with minicell traffic is the quantity of overhead information that accompanies the traffic and which is used in the de-multiplexing and delineation process. With the rapidly increasing volume of this traffic there is an increasing risk of congestion. Further, this overhead information occupies bandwidth that might otherwise be allocated to revenue earning payload transmission.

SUMMARY OF THE INVENTION

It is an object of the invention to minimise or to overcome these disadvantage.

It is a further object of the invention to provide an improved method and apparatus for the delivery of services to user terminals.

According to one aspect of the invention there is provided a method of for transporting service (Servco) traffic between terminals in a network arrangement comprising a service access layer incorporating multimedia gateways for access by said terminals, an asynchronous network layer, a service layer incorporating adaptation layer switches each coupled to the network layer, and a transport layer providing a connection medium between said adaptation layer switches, the method including packetising the service traffic into minicells on ingress to the network layer, multiplexing the minicells to form the payload of ATM cells, transmitting the ATM cells in header-less form across the network layer, and de-multiplexing and recovering the minicells on egress from the network layer.

According to another aspect of the invention there is provided a network arrangement for transporting service (Servco) traffic between terminals coupled to the network, the arrangement comprising a service access layer incorporating multimedia gateways for access by said terminals, an asynchronous network layer, a service layer incorporating adaptation layer switches each coupled to the network layer, and a transport layer providing a connection medium between said adaptation layer switches, the arrangement being characterised by means for packetising the service traffic into minicells on ingress to the network layer and for multiplexing the minicells to form the payload of ATM cells, means for transmitting the ATM cells in header-less form across the network layer, and means for de-multiplexing and recovering the minicells on egress from the network layer.

The ATM stream takes the form of packets or mini-cells of variable but deterministic length, whose length is either explicitly coded within known positions in those packets, or may be implicitly derived from other known information in those packets, e.g. the circuit identifier for those packets. This implicit derivation may accommodate and depend on the state of the communications path or the state of the particular circuit within the communications path, which implies that the length may vary between an arbitrary multiplex of circuits of distinct users, or may also or separately vary per user. The length delineates the start of the subsequent packet of that communications stream. The packets contain in known fixed or derivable positions a linear systematic code employing redundancy to protect essential fields of those packets against error. The code also defines to a better than random probability the relative start boundary of same packet, which in conjunction with the length of the same packet can be used to correlate the linear systematic code word of all subsequent packets in the communications streams. This correlation may be assisted by the regular periodic insertion of a field whose contents form a linear systematic code word. This code word indicates the next or subsequent packet start boundaries to improve the performance of the delineation apparatus at the receiving equipment.

The ATM layer provides a cell of fixed size of 53 octets, the first five of which form a header that is constructed to be a linear systematic code word. The ATM layer may delineate these cell using methods described in for example in our United Kingdom specification No 2,232,040. Above the ATM layer is an adaptation layer designed to suit specific traffic types, of which one currently being proposed is ALL-CU or AAL-6. The essence of the AAL-6 proposals is to create a mini-cell, essentially a variable length packet with a fixed header at the start, which ensemble is appreciable shorter in length than the ATM cell to overcome the cell assembly delay which has been experienced in low-bit delay sensitive and real-time telephony applications.

The mini-cell is apportioned per user or multiplicity of users and carries its own circuit identifier in the header which is protected as a linear systematic code by parity check bits that may also form a class of cyclic code or equivalent code known to those skilled in the art. Many users' mini-cells may be multiplexed into one ATM connection to overcome the cell assembly delay. Consequently, all these ATM cells carry the same header information. On a leased line application from a mobile base station transceiver to a mobile switching centre for example, only one ATM connection need be configured, in which case there is no replication of the same mini-cell circuit identifier being duplicated in a number of connections on the same communication channel and the ATM header becomes redundant.

Mini-cells must be separately delineated after the ATM cell stream has been delineated. A number of methods are possible that either allow the mini-cell header to be the sole means of delineation by virtue of the linear systematic code word of its header, or by using a pointer field at the start of each ATM cell payload that signifies the offset of the first mini-cell boundary in that ATM cell payload, or by ensuring that there is forced to be a mini-cell header at the start of every ATM cell payload, or by gathering together all the mini-cell headers to the end of the payload.

In the present invention, the ATM header is no longer required by virtue of its redundant contents and, because the mini-cell stream may be delineated independently of the ATM cell stream, this permits a greater bandwidth utilisation of the communications channel by allowing more mini-cells to be transmitted within a given bandwidth.

BRIEF DESCRIPTION OF THE DRAWINGS

Embodiments of the invention will now be described with reference to the accompanying drawings in which.

DESCRIPTION OF PREFERRED EMBODIMENT

Figure 1:
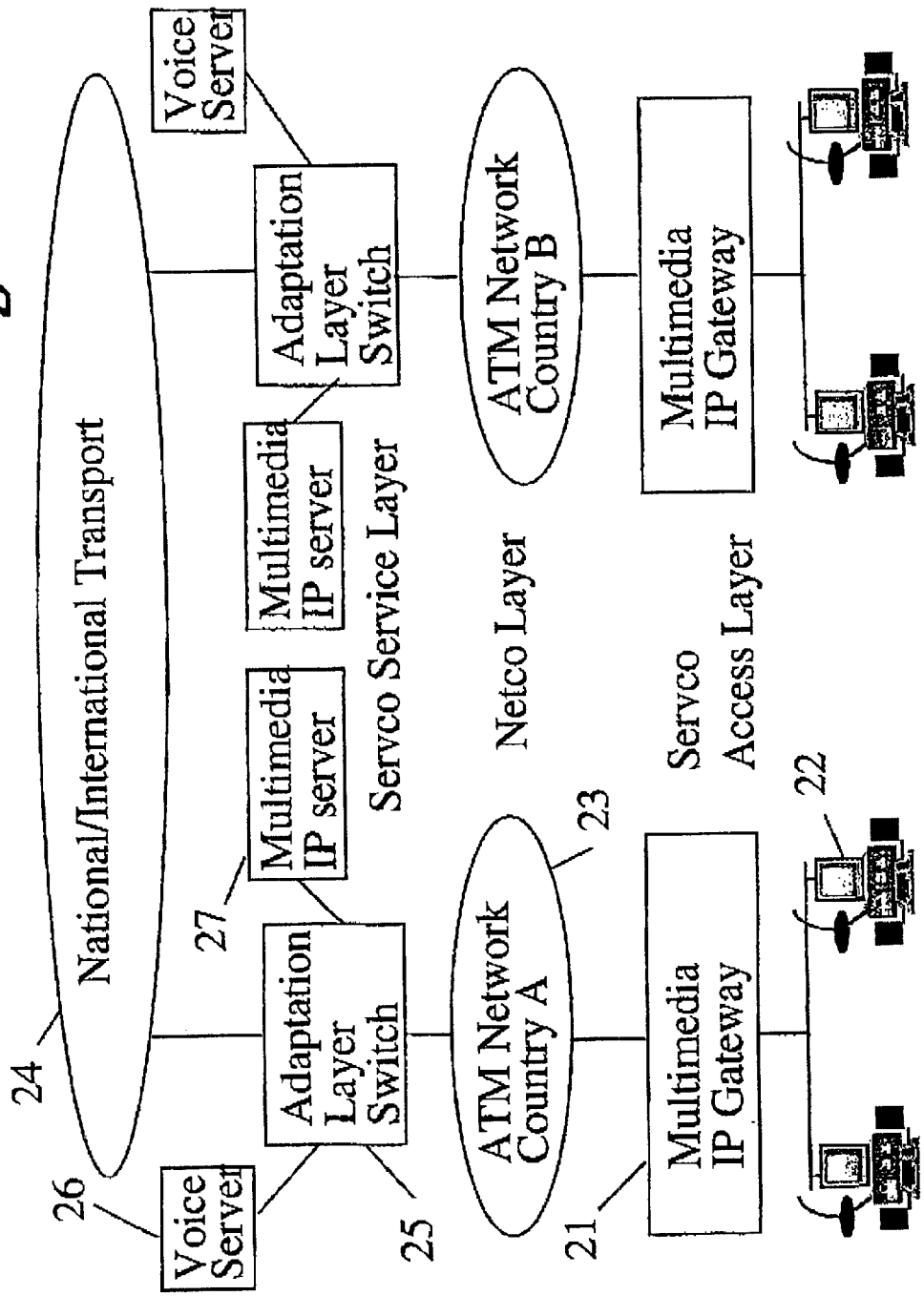
FIG. 1 is a general schematic diagram indicating the Netco/Servco partitioning in an ATM network.

Referring to FIG. 1 of the drawings, which illustrates the principle of Netco/Servco partitioning, the network architecture incorporates a layered arrangement comprising a Servco access layer, a Netco layer, a Servco service layer and a national or international transport layer. The Servco access layer comprises multimedia IP gateways 21 providing access from user terminals 22 to respective ATM networks 23 which comprise the Netco layer. The gateways 21 provide an adaptation interface between the ethernet environment of the terminals 22 and the ATM environment of the Netco layer The ATM networks 23 are coupled to the international transport layer 24 via adaptation layer switches 25 which provide an interface function therebetween. Each switch 24 may also be coupled to a voice server 26 and a multimedia IP server 27. The national/international transport layer may be synchronous or asynchronous and provides a transport medium between the ATM networks constituting the Netco layer. Servco traffic from a number of user terminals is multiplexed together for transmission over the Netco layer.

The Netco layer comprises a transmission medium that is provided by a network operator, and the Servco layer comprises the mulimedia, ISDN and Internet service functions that are delivered from a service provider. The Netco layer thus provides a transport medium whereby these services may be delivered to the user terminals.

Traffic within the ATM networks 23 is carried in ATM minicells, preferably conforming to the ITU AAL2 standard, which are assembled into ATM cells for transmission over the network. Minicells from a number of users are multiplexed together to ensure rapid filling of the ATM cells and minimise the assembly delay. De-multiplexing is performed to recover the Servco traffic for delivery to the receiving terminal. This multiplexing and de-multiplexing is performed by the multimedia gateways serving the terminals. Note that the multimedia gateways are not required to provide a switching function as this is provided by the adaptation layer switches.

In addition to communication with the 'local' multimedia server 27 and/or voice server 26 via the Netco layer and adaptation layer switch, user terminal may also communicate either with a remote user terminal over the national/international transport layer or with a remote multimedia and/or voice server. In this way a full Internet service can be provided. The services may also include Internet telephony.

Figure 2:
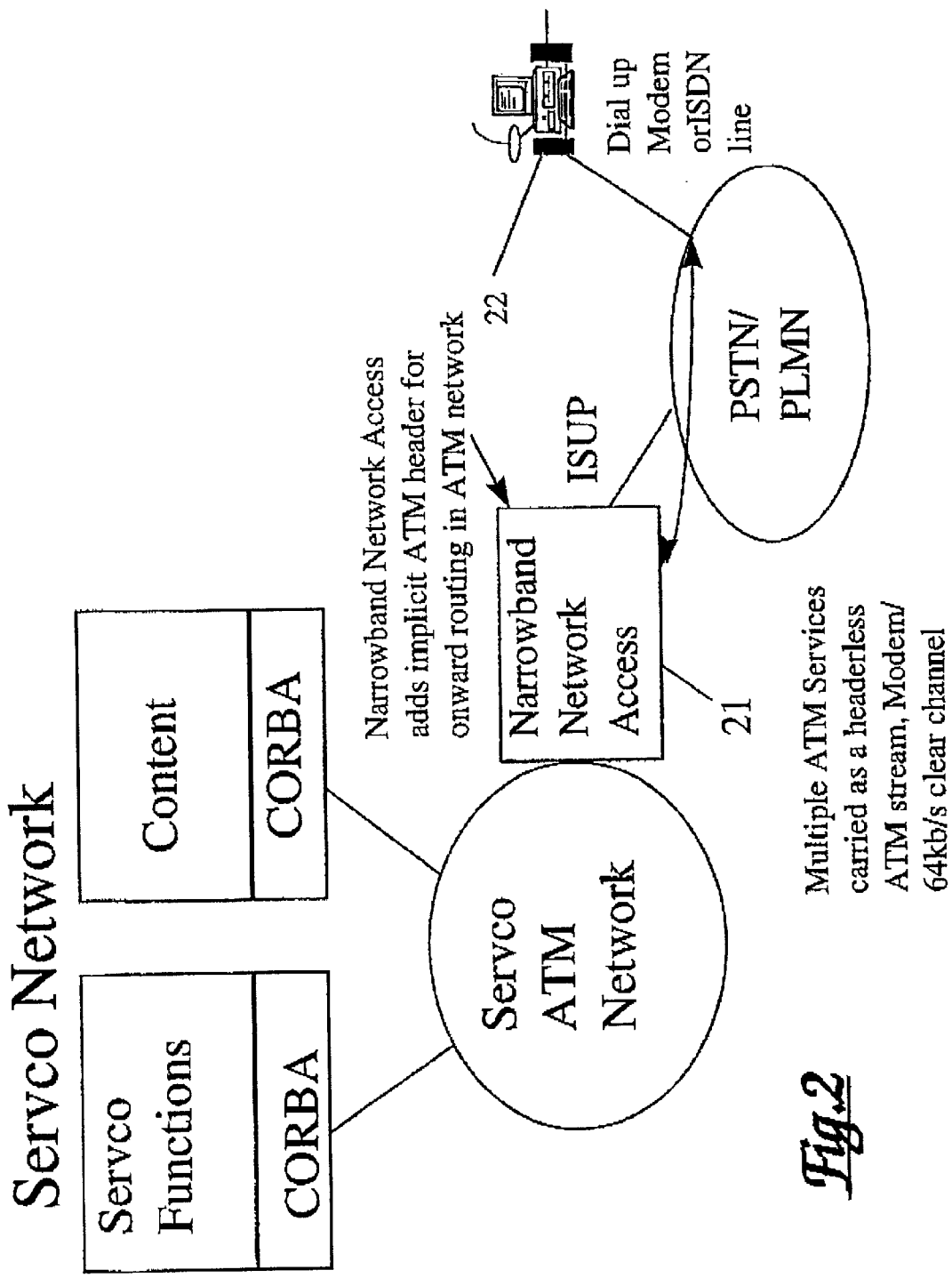
FIG. 2 shows the configuration of the Servco network showing an alternative narrow band access arrangement.

FIG. 2 illustrates a modification in which access to services is provided via a dial up modem or ISDN line. Multiple services are carried as a header-less ATM stream. The narrow band network access, i.e. the gateway, adds an implicit ATM header for onward routing in a Servco ATM network.

We have found that the AAL2 protocol permits separation of the Servco layer so as to provide network-independent functionality for the Netco layer which provides ATM connectivity. The interaction between CPE equipment generating ATM AAL2 streams and the Servco equipment which is strategically located, e.g. on a per country basis, provides service functionality. The technique can be extended The following is a description of the operation without the ATM cell header that shows it to be a method robust to channel error and to provide recovery of cell delineation within a fully acceptable bound of confidence and duration fit. The transmission of the Servco traffic over the Netco layer is point-to point. Thus, the multiple ATM services can be carried as a header-less stream. The gateway providing the narrow band access function simply adds an implicit header for onward routing in the Netco ATM network.

Figure 3:
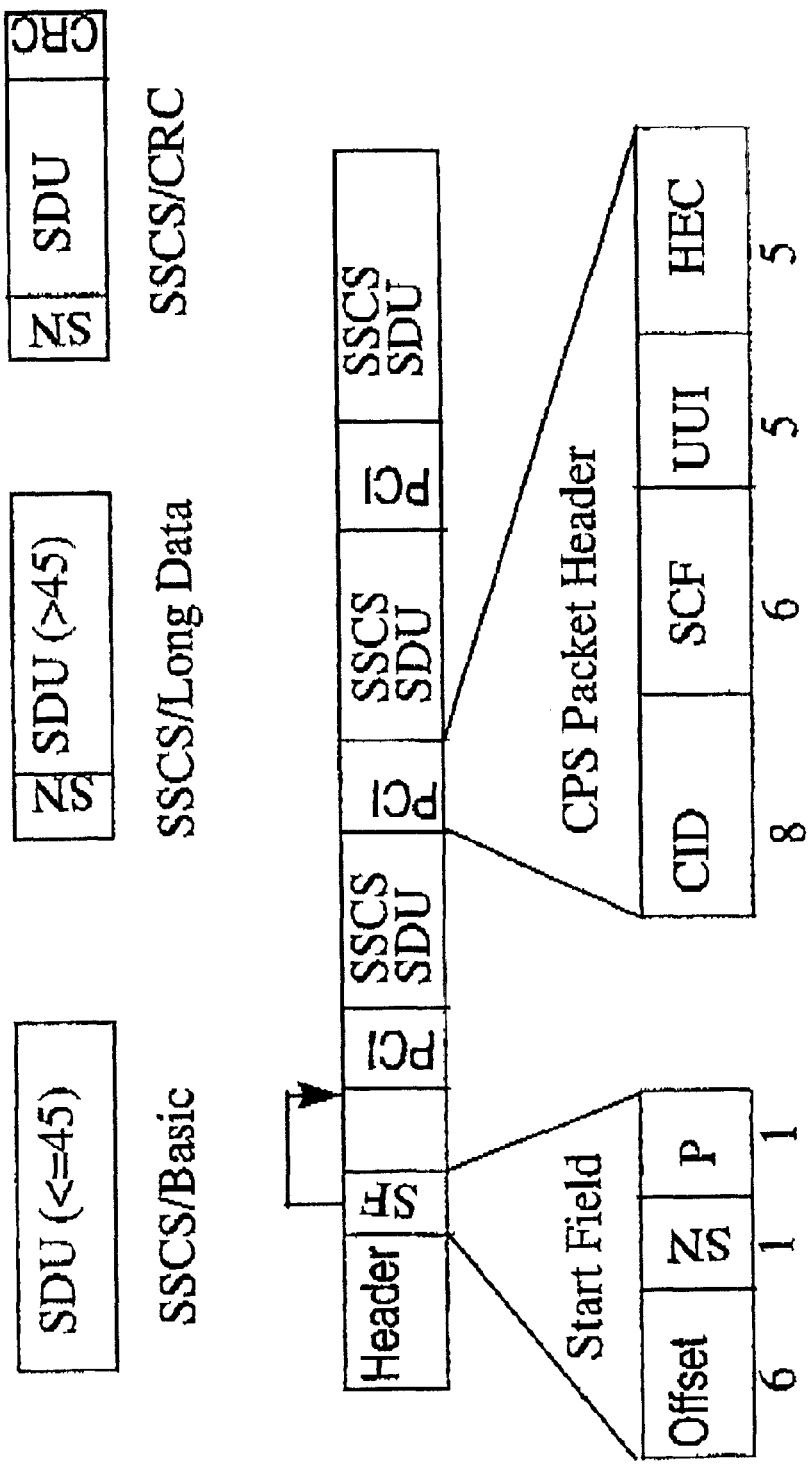
FIG. 3 illustrates an ATM-AAL-CU format for use in the network of FIG. 2.

A schematic view of the ATM cell and minicell format is illustrated in FIG. 3. In this figure the following field definitions are employed for the MAD (mux and demux) fields and for the payload control information (PCI) fields.

| FIELDS | |
|---|---|
| Offset | |
| 000001 | Offset to first |
| — } | minicell |
| 101111 | boundary |
| SN | Sequence number |
| P | Even parity |
| HEC | Header error control |
| CID | Channel identifier |
| UUI | User to user information |
| LI | Length indicator |
| 000001 | |
| — } | e.g. explicit SDU length |
| 101111 | |
| xxxxxx | e.g. code point, continuation, minicell sequence no., change length indicator |

Each ATM cell incorporates a start field incorporating an offset, a sequence number to indicate a missing or out of sequence cell, and a parity check. Each minicell incorporates a CPS packet header incorporating a channel identifier, a length indicator, user-to-user information and an error control. In some applications, e.g. where the minicells are of known length, or where the length may be inferred on a user basis, the length indicator field may be dispensed with.

The offset to the first minicell boundary provides a pointer from the start of the ATM cell to the start of the first minicell in the payload. Further minicell boundaries can then be determined from explicit or implicit information contained in the headers of the minicells within the payload. By obviating the need for a large amount of header information at the start of each ATM cell, a significant amount of bandwidth is made available for revenue earning payload traffic.

As discussed above, the ATM header is not required as the relevant information is regenerated at the receiving station on egress from the ATM environment. The receiver of the ATM cell stream begins in the hunt state in which it searches bit by bit for a valid code word for the pointer at the payload start if available or the valid code word of a mini-cell header. From that pointer or header it can then extract explicit or implicit length information to the start of the very next mini-cell, on receipt of which it enters a pre-synchronised state. If the pointed to position contains a valid code word, the same process repeats a certain configured number of times that may be desirably tuned to the error characteristics of the communications medium, after which the receiver enters a synchronised state. The receiver may choose to use or discard or buffer for later use the information received whilst in the pre-synchronised state. An error in the pre-synchronised state causes the receiver to revert to the hunt state.

The receiver remains in the synchronised state until it can no longer reliably delineate the mini-cell boundaries due to channel error. This may occur if the explicit length field or, field from which the length may be implicitly derived is irrevocably errored in the mini-cells and there is no known or highly probable position for the next mini-cell start, in which case the receiver reverts to the hunt state. If there is certain to be no further mini-cell start before the next pointer, because the distance is known to be below a minimum packet length; then the receiver may remain in the synchronised state and use the next received pointer to recover information from the mini-cell payload. If the pointer is errored then the indication of length from the last mini-cell allows the receiver to remain in the synchronised state. Any second delineation error takes the receiver from the synchronised to the hunt state.

The amount of redundancy use to protect the mini-cell header may be chosen to suit the error incidence of the communications channel, and the number of consecutive headers required to transition from the pre-synch to the synch state may be tuned to both the forme and the latter for performance and to minimise the error extension. For example, with a six bit pointer protected as an eight bit field and a three octet mini-cell header protected by a five bit cyclic redundancy code (CRC), if no error occurred in the channel then a receiver of a pointer and 6 mini-cell headers would be synchronised to a confidence of $0.25 \exp(6) < 1E6$ or 99.9999% certainty. If there is a random error in the channel of probability p, then the chance of the delineation mechanism being restarted is $(1-8p) \times (1-16p) \exp(6)$ which is approximately $104p$. This is two orders of magnitude above the latent bit error rate. If the latent bit error rate (BER) is very small, say $1e-7$, then this is an acceptable bound.

Due to the cyclic nature of a class of linear systematic code words, the confidence bound may be adversely affected and synchronisation time increased. This problem is readily addressed by the addition of a coset term, known to those skilled in the art.

A suitable efficient apparatus for searching bit by bit for valid code words is fully described in our aforementioned specification No GB 2232040, the contents of which are incorporated herein by reference.

What is claimed is:

1. A method of transporting service (Servco) traffic between user terminals operating in an Ethernet environment in a network arrangement being partitioned into a plurality of layers comprising: a service access layer incorporating multimedia gateways for access by said terminals, an asynchronous network layer comprising a plurality of ATM networks and accessed via said gateways, a service layer incorporating adaptation layer switches providing access to multimedia IP servers and each coupled to the asynchronous network layer, and a transport layer providing a connection medium between said adaptation layer switches, wherein said gateways provide an adaptation interface between the Ethernet environment of the terminals and the ATM environment of the asynchronous network layer and are each arranged to multiplex voice and data traffic from a plurality of terminals into minicells, the method comprising: at a first gateway, multiplexing voice and data traffic from a plurality of users into variable length minicells and assembling said minicells into ATM cells, providing within each ATM cell a pointer to the start of the first minicell in the payload of that cell, transporting the ATM cells as a header-less stream over the transport layer, and, at a second gateway, delineating and de-multiplexing said minicells, wherein said delineation is performed by searching the ATM stream for a valid code word for a pointer identifying the start of a minicell, and, for that minicell and subsequent minicells, determining length information so as to determine the start of the next minicell.

2. A method as claimed in claim 1, wherein each said adaptation layer switch is coupled to a multimedia server and a voice/ISDN server whereby services may be delivered to said terminals.

3. A method as claimed in claim 2, wherein said gateways provide an interface between an Ethernet protocol employed by said terminals and an ATM protocol of the asynchronous network layer.

4. A method as claimed in claim 1, wherein each said minicell incorporates a length indicator whereby delineation of the minicells is effected on egress from the network.

5. A method as claimed in claim 4, wherein delineation of minicells is determined from user specific information associated with each said minicell.

6. A network arrangement for transporting service (Servco) traffic between user terminals operating in an Ethernet environment, the network arrangement being partitioned into a plurality of layers comprising: a service access layer incorporating multimedia gateways for access by said terminals, an asynchronous network layer comprising a plurality of ATM networks and accessed via said gateways, a service layer incorporating adaptation layer switches providing access to multimedia IP servers and each coupled to the asynchronous network layer, and a transport layer providing a connection medium between said adaptation layer switches, wherein said gateways provide an adaptation interface between the Ethernet environment of the terminals and the ATM environment of the asynchronous network layer and are each arranged to multiplex voice and data traffic from a plurality of terminals into variable length minicells, wherein said gateways are arranged to assemble said minicells into ATM cells, and to provide each ATM with cell a pointer to the start of the first minicell in the payload of that cell so as to enable transport of the ATM cells as a header-less stream over the transport layer, and wherein said gateways are further arranged to delineate and de-multiplex said minicells by searching the ATM stream for a valid code word for a pointer identifying the start of a minicell, and, for that minicell and subsequent minicells, determining length information so as to determine the start of each next minicell.

7. A network arrangement as claimed in claim 6, wherein each said adaptation layer switch is coupled to a multimedia server and a voice/ISDN server whereby services may be delivered to said terminals.

8. A network arrangement as claimed in claim 7, wherein said gateways provide an interface between an Ethernet protocol employed by said terminals and an ATM protocol of the asynchronous network layer.

* * * * *